United States Patent
Wang et al.

(10) Patent No.: US 9,775,007 B2
(45) Date of Patent: Sep. 26, 2017

(54) GROUP BASED LOCATION SERVICE IN WIRELESS LOCAL AREA NETWORKS

(71) Applicant: MEDIATEK Singapore Pte. Ltd., Singapore (SG)

(72) Inventors: Chao-Chun Wang, Taipei (TW); Chih-Shi Yee, Hsinchu County (TW); Ching-Hwa Yu, Tainan (TW); James June-Ming Wang, San Marino, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 89 days.

(21) Appl. No.: 14/510,039

(22) Filed: Oct. 8, 2014

(65) Prior Publication Data
US 2015/0098460 A1    Apr. 9, 2015

Related U.S. Application Data

(60) Provisional application No. 61/888,589, filed on Oct. 9, 2013.

(51) Int. Cl.
*H04W 4/00* (2009.01)
*H04W 4/08* (2009.01)
*H04W 4/02* (2009.01)
*H04W 64/00* (2009.01)
*G01S 5/00* (2006.01)
*G01S 5/02* (2010.01)
(Continued)

(52) U.S. Cl.
CPC ............ *H04W 4/08* (2013.01); *G01S 5/0027* (2013.01); *G01S 5/0289* (2013.01); *G01S 5/14* (2013.01); *H04W 4/02* (2013.01); *H04W 64/00* (2013.01); *H04W 84/12* (2013.01)

(58) Field of Classification Search
CPC .......... H04L 2012/5608; H04W 84/12; H04W 88/08; H04W 80/04; H04W 88/06; H04W 84/18; H04W 36/30; H04W 36/24
USPC ..................... 370/310.2, 328, 332, 333, 338
See application file for complete search history.

(56) References Cited

U.S. PATENT DOCUMENTS

| | | | | |
|---|---|---|---|---|
| 7,126,527 | B1 * | 10/2006 | Bajikar | ................... G01S 19/04 342/357.27 |
| 2003/0123420 | A1 * | 7/2003 | Sherlock | ............... H04W 24/00 370/338 |

(Continued)

OTHER PUBLICATIONS

International Search Report and Written Opinion of International Search Authority for PCT/US2014/059788 dated Jan. 13, 2015(8 pages).

*Primary Examiner* — Brenda H Pham
(74) *Attorney, Agent, or Firm* — Imperium Patent Works; Zheng Jin; Mark Marrello (57) ABSTRACT

A method of group-based location service is proposed. A wireless station initiates a ranging process with a plurality of wireless communications devices in a wireless local area network. The station belongs to a group of wireless stations. The station exchanges measurement frames with the plurality of wireless communications devices during the ranging process. The station then computes a plurality of distances to each of the plurality of wireless communications devices and thereby determining an absolute location of the station. Finally, the station informs the absolute location to a group owner of the group of wireless stations.

18 Claims, 5 Drawing Sheets

(51) Int. Cl.
*G01S 5/14* (2006.01)
*H04W 84/12* (2009.01)

(56) References Cited

U.S. PATENT DOCUMENTS

| | | | | |
|---|---|---|---|---|
| 2004/0203873 | A1* | 10/2004 | Gray | H04W 48/08 |
| | | | | 455/456.1 |
| 2010/0020776 | A1* | 1/2010 | Youssef | H04W 64/00 |
| | | | | 370/338 |
| 2013/0073983 | A1* | 3/2013 | Rasmussen | G06Q 30/02 |
| | | | | 715/753 |
| 2013/0188766 | A1* | 7/2013 | Williams | G01S 17/105 |
| | | | | 377/19 |

* cited by examiner

GROUP BASED POSITIONING THROUGH FTM RANGING

FIG. 5

FIG. 6
GROUP BASED POSITIONING WITH COOPERATIVE RANGING MEASUREMENTS

FIG. 7

GROUP BASED LOCATION SERVICE IN WIRELESS LOCAL AREA NETWORKS

CROSS REFERENCE TO RELATED APPLICATIONS

This application claims priority under 35 U.S.C. §119 from U.S. Provisional Application No. 61/888,589, entitled "Group Location," filed on Oct. 9, 2013, the subject matter of which is incorporated herein by reference.

TECHNICAL FIELD

The disclosed embodiments relate generally to wireless network communications, and, more particularly, to group based location service in wireless local area networks.

BACKGROUND

IEEE 802.11 is a set of media access control (MAC) layer and physical layer (PHY) specification for implementing wireless local area network (WLAN) communication, called Wi-Fi, in the unlicensed (2.4, 3.6, 5, and 60 GHz) frequency bands. The standards and amendments provide the basis for wireless network products using the IEEE 802.11 frequency bands. IEEE 802.11 plays an important role in the growing application of Indoor and Outdoor Location. The key applicable Wi-Fi technology is that of ranging using time-of-flight (TOF) ranging measurements defined in IEEE 802.11v. Once the distance between devices is measured, the information can be used to determine device location.

Point-to-point measurement enhancements using iterative measurements, such as Fine Timing Measurement (FTM), have been proposed in IEEE 802.11-REVmc for Indoor Location. Based on FTM, an initiating station exchanges FTM frames with a responding station to measure the time-of-flight (TOF) or the Round Trip Delay (RTD/2). The initiating station then computes its range to the responding station. To calculate a station position, the station performs ranging measurements with multiple access points (APs) via FTM frame exchange and obtains AP's positions. Typically, FTM positioning requires the initiating station to exchange FTM frames with multiple responding APs for TOF measurements in order to determine its absolute location. For 3D positioning, the station needs to exchange FTM frames with four APs in order to determine its absolute location.

The FTM protocol suffers from a list of drawbacks. First, the station possibly needs to switch to different channels in which the APs operate on. Second, the station needs to consume high power due to long session of FTM frame exchange. Third, dense AP deployment is required. Fourth, FTM traffic load increases when more stations perform positioning. The FTM protocol overhead can be substantial if all stations in a dense environment need to perform ranging independently.

Many wireless devices often operation in one or more groups, such as a P2P group. For some applications involving a group of wireless devices, not every station needs to determine its location using FTM. For example, coarse location information is shared among group members. The location determination activities of group members can be managed by a Location Group Leader (LGL), e.g., the GO (Group Owner) of a P2P network. Accordingly, it is desired to have a method for doing Group Location in order to lower protocol overhead and provide more meaningful group related location information.

SUMMARY

A method of group-based location service is proposed. A wireless station initiates a ranging process with a plurality of wireless communications devices in a wireless local area network. The station belongs to a group of wireless stations. The station exchanges measurement frames using Wi-Fi technology with the plurality of wireless communications devices during the ranging process. The station then computes a plurality of distances to each of the plurality of wireless communications devices and thereby determining an absolute location of the station. Finally, the station informs the absolute location to a group owner of the group of wireless stations.

In one embodiment, the group owner selects the station from the group based at least on one of a device location, a device capability, a device loading, a link condition, a power status, and wireless channel availability of the station.

In another embodiment, a second station is selected from the group of wireless stations to initiate a second ranging process. In one example, the multiple selected stations determine the group's location through FTM ranging and reduce FTM traffic. In another example, the multiple selected stations cooperatively conduct ranging measurements and collect useful location information for the group.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
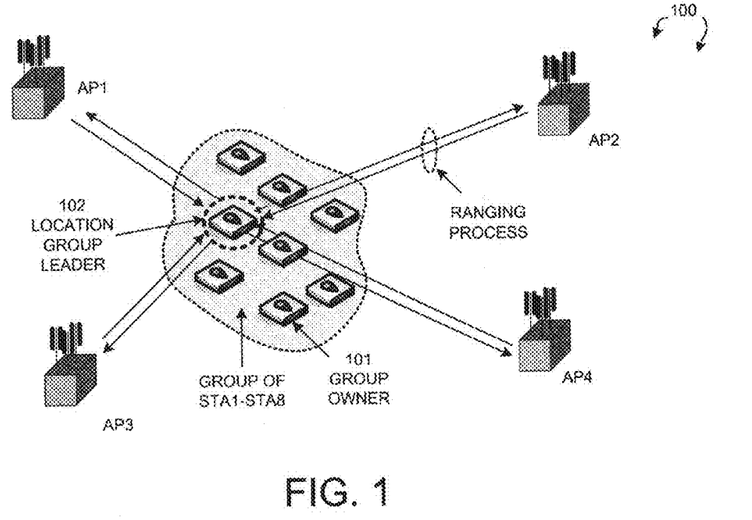
FIG. 1 illustrates a wireless location area network with group-based positioning in accordance with one novel aspect.

FIG. 1 illustrates a wireless location area network 100 with group-based positioning in accordance with one novel aspect. Wireless local area network 100 is an indoor network and comprises a plurality of access points AP1-AP4 and a group of non-AP wireless stations STA1-STA8. The plurality of access points AP1-AP4 are located in different physical locations in the indoor wireless network to facilitate indoor location service. The group of non-AP wireless stations STA1-STA8 belong to a communication group, e.g., a P2P group in an ad hoc network. In IEEE 802.11, an ad hoc network is a network where stations communicate only peer-to-peer using independent Basic Service Set (BSS). In a Wi-Fi peer-to-peer (P2P) group, the group owner (GO) operates as an access point and all other devices are clients. There are two main methods to establish a group owner in the Wi-Fi P2P group. In a first method, the user sets up a P2P group owner manually. This method is also known as Autonomous Group Owner (autonomous GO). In a second method, also called negotiation-based group creation, two wireless devices compete based on their group owner intent value. The device with higher group owner intent value becomes a group owner and the other device becomes a client. Group owner intent value can be determined based on whether the wireless device performs a cross-connection between an infrastructure WLAN service and a P2P group, the remaining power in the wireless device, whether the wireless device is already a group owner in another group, and/or a received signal strength of the first wireless device.

Point-to-point measurement enhancements using iterative measurements, such as Fine Timing Measurement (FTM), have been proposed in IEEE 802.11-REVmc for Indoor Location. Based on FTM, an initiating station exchanges FTM frames with a responding station to measure the time-of-flight (TOF) or the Round Trip Delay (RTD/2). The initiating station then computes its range to the responding station. To calculate a station position, the station performs ranging measurements with multiple access points (APs) via FTM frame exchange and obtains AP's positions. Typically, FTM positioning requires the initiating station to exchange FTM frames with multiple responding APs for TOF measurements in order to determine its absolute location. For 3D positioning, the station needs to exchange FTM frames with four APs in order to determine its absolute location.

The FTM protocol suffers from a list of drawbacks. First, the station possibly needs to switch to different channels in which the APs operate on. Second, the station needs to consume high power due to long session of FTM frame exchange. Third, dense AP deployment is required. Fourth, FTM traffic load increases when more stations perform positioning. The FTM protocol overhead can be substantial if all stations in a dense environment need to perform ranging independently.

In accordance with one novel aspect, one or more Location Group Leader (LGL) is selected from the group to obtain coarse location information to be shared among the entire group. The location determination activities, e.g., the FTM frame exchange, is managed only by the LGL of the group. The LGL may be selected by the group owner, e.g., the GO of a P2P group, which may be the GO itself, or some other wireless stations within the group. The LGL may be selected based on a device location, a device capability, a device loading, a link condition, a power status, and wireless channel availability of the first station of the selected wireless station. The basic assumption is that the GO makes group members aware of their role in Group Location service. The GO is sufficiently aware of the location of its clients, which can be determined via device-to-device FTM or other means. In addition, as long as the LGL obtained coarse location information, such coarse location information is sufficiently useful for the other members in the group. As a result, the rest of the group members do not need to be involved in the high-overhead FTM process.

In the example of FIG. 1, wireless station 101 is a group owner of the communication group. GO 101 selects another wireless station 102 to be the location group leader to obtain location information to be shared among the group. For example, LGL 102 performs ranging processes with AP1, AP2, AP3, and AP4 respectively using FTM protocol. LGL 102 is an initiating station that initiates the ranging process with each AP and computes its range to each AP based on frame exchange and measurements. LGL 102 then determines its absolute location from the measurement result. Because only LGL 102 performs the location determination activities, the ranging protocol overhead is reduced and more meaningful group related location information is provided.

Figure 2:
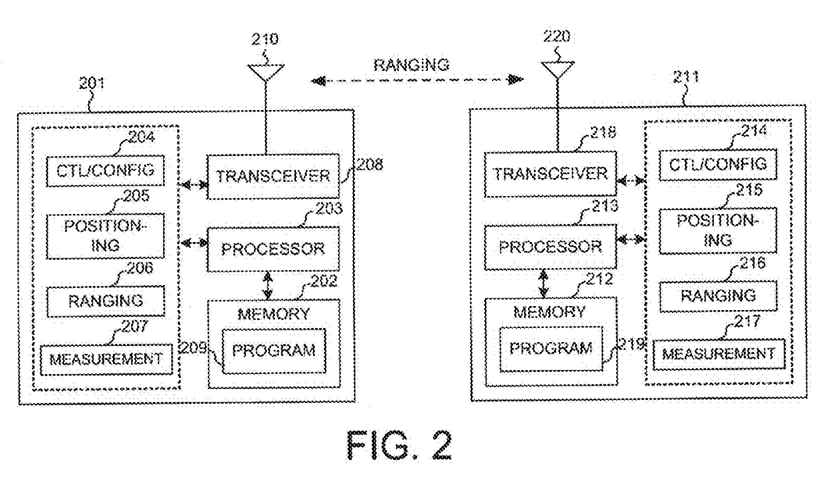
FIG. 2 is a simplified block diagram of an initiating wireless device and a responding wireless device supporting certain embodiments of the present invention.

FIG. 2 is a simplified block diagram of an initiating wireless station 201 and a responding wireless station 211 in accordance with one novel aspect. The initiating device is referred to as an initiator, and the responding device is referred to as a responder. Both devices can be an AP station or a non-AP station. Initiating device 201 comprises memory 202, a processor 203, a control and configuration module 204, a positioning module 205, a ranging module 206, a measurement module 207, and a transceiver 208 coupled to antenna 210. Similarly, responding device 211 comprises memory 212, a processor 213, a control and configuration module 214, a positioning module 215, a ranging module 216, a measurement module 217, and a transceiver 218 coupled to antenna 220. In the transmitting direction, the transceiver converts received baseband signals from the processor to RF signals and sends out to the antenna. In the receiving direction, the processor processes the received baseband signals from the transceiver and invoke different functional modules to perform various features and embodiments supported by the wireless devices.

The different modules are functional modules that can be implemented and configured in software, firmware, hardware, or any combination thereof. The function modules, when executed by processors 203 and 213 (via program instructions 209 and 219 contained in memory 202 and 212), interwork with each other to allow the wireless devices to perform enhanced channel access. For example, the measurement module performs timing measurements during a group-based ranging process, the ranging module establishes a group-based ranging protocol, the positioning module determines the absolute location of the wireless device based on the ranging measurement result, and the control and configuration module configures group-based ranging and measurement related parameters and controls the group-based positioning procedure.

Figure 3:
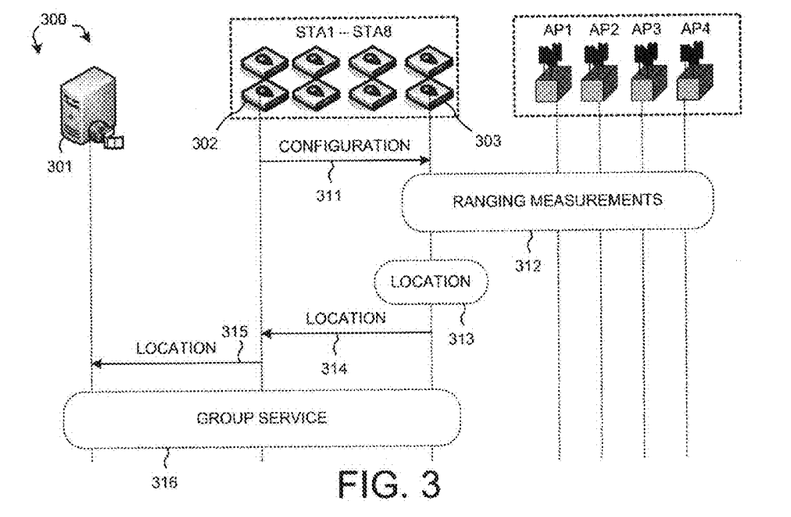
FIG. 3 illustrates a first embodiment of group-based positioning with one initiating station for location in accordance with one novel aspect.

FIG. 3 illustrates a first embodiment of group-based positioning with one initiating station in accordance with one novel aspect in a wireless local area network 300. Wireless local area network 300 comprises an application server 301, a group of wireless stations STA1 to STA8, and a plurality of access points AP1 to AP4. In the embodiment of FIG. 3, the group of wireless stations has a group owner STA/GO 302, and a selected group location leader STA 303 that manages the location determination activities for the entire group. STA/LGL 303 acts as a Proxy FTM, where only STA 303 participates in the FTM procedure. The assumption is that knowing only the LGL's location is useful for all clients. For example, a group of tourists following a museum guide. The LGL obtains location information and sends to the GO, which can be the tour guide. The tour guide receives and forwards Assistance Data to all group members.

In step 311, wireless station 302, as a GO, selects wireless station 303 as a LGL for the group and sends configuration information to STA 303. Upon receiving the configuration information, STA 303 becomes aware of its role in Group Location service. In step 312, STA 303 initiates a ranging process with each of the plurality of access points AP1 to AP4. In one example, the ranging process is an FTM procedure. STA 303 first sends an FTM request to each AP and then exchanges FTM frames with each AP for timing measurements. Upon collecting all the timestamps from the APs, in step 313, STA 303 is able to compute its range to each AP and thereby determining its own location given that STA 303 also has knowledge about the location of each AP. In step 314, STA 303 sends the location information to STA 302, the group owner. In step 315, STA 302 forwards the location information to application server 301 of a service provider. In step 316, the service provider provides certain service to the group based on the location information.

In one example, in a tour group consisting of many tour members following a museum tour guide and the tour guide is the group owner (GO). Within the museum, the application server 301 only need to know the location of the tour guide. Based on the location, the audio information of the museum exhibition can be multi-casted to the STAs in the group. Similar scenario can apply to a traveling group for sightseeing. This group-based location service method reduces the amount of ranging/FTM traffic. The P2P clients remain anonymous while enjoying the location-based service. In addition, the GO provides extra level of security and privacy for the P2P clients. Of course, this method needs mechanism for Group Location configuration and intra-group location information exchange among the group members.

Figure 4:
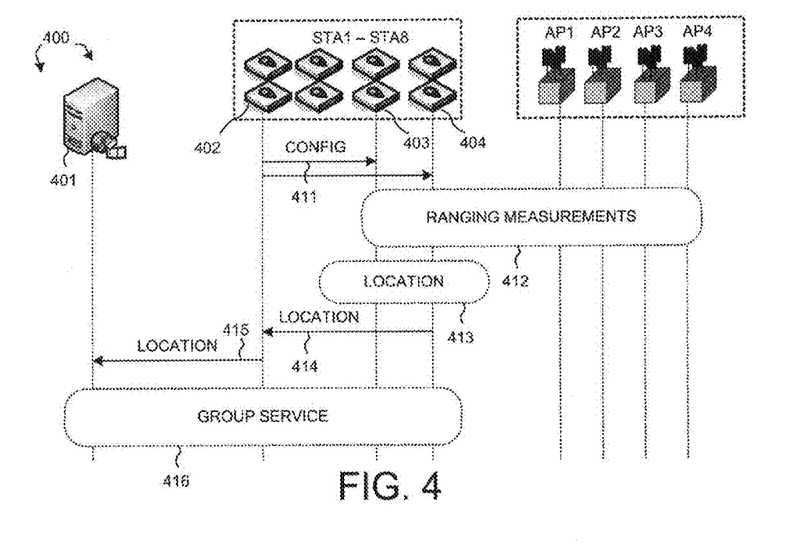
FIG. 4 illustrates a second embodiment of group-based positioning with multiple initiating stations for location in accordance with one novel aspect.

FIG. 4 illustrates a second embodiment of group-based positioning with multiple initiating stations in accordance with one novel aspect in a wireless local area network 400. Wireless local area network 400 comprises an application server 401, a group of wireless stations STA1 to STA8, and a plurality of access points AP1 to AP4. In the embodiment of FIG. 4, the group of wireless stations has a group owner STA/GO 402, and multiple selected group location leaders STA/LGL 403 and STA/LGL 404 that manage the location determination activities for the entire group. Both STA 403 and STA 404 are selected as LGL to perform ranging. For example, GO 402 directs capable clients to perform ranging, e.g., chaperones for a class trip or devices with sufficient power.

In step 411, wireless station 402, as a GO, selects both wireless stations 403 and 404 as LGLs for the group and sends configuration information to both STAs 403 and 404. Upon receiving the configuration information, STA 403 and 404 become aware of their role in Group Location service. In step 412, STA 403 and STA 404 initiate ranging/FTM processes with the plurality of access points AP1 to AP4. The two LGLs may perform the ranging independently or cooperatively. Upon collecting the ranging measurements from the APs, in step 413, STA 403 and STA 404 determine their own locations knowing the locations of each AP. In step 414, STA 403 and/or STA 404 sends the location information to STA 402, the group owner. In step 415, STA 402 forwards the location information to application server 401 of a service provider. In step 416, the service provider provides certain service to the group based on the location information. This group-based location service method reduces the amount of ranging/FTM traffic. In one example, concurrent FTM ranging in different channels saves time. In another example, location information from multiple clients help to establish the group boundary useful for geofencing. Of course, the GO needs to monitor the location or relative location of some clients. For scalability, the location information within the group may need to be managed in a hierarchical manner.

Figure 5:
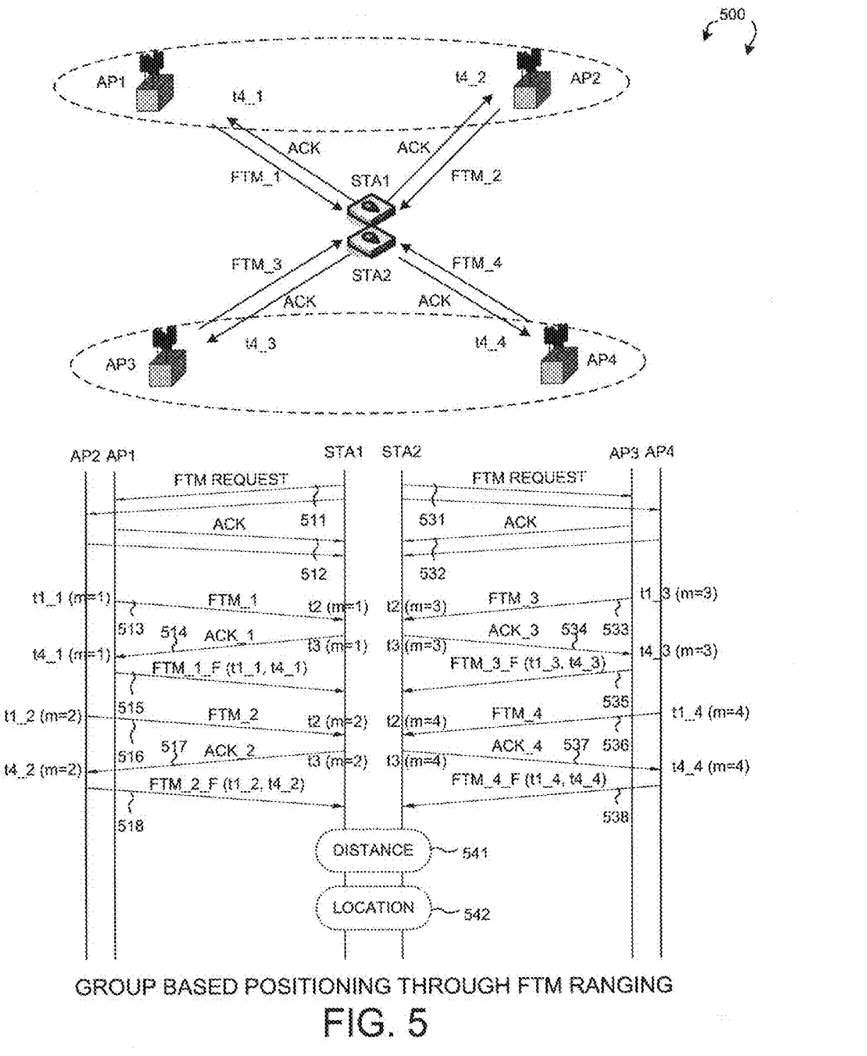
FIG. 5 illustrates one embodiment of group-based location through FTM ranging.

FIG. 5 illustrates one embodiment of group-based positioning through FTM ranging in a wireless local area network 500. Wireless local area network 500 comprises four access points AP1 to AP4, and a group of wireless stations including STA1 and STA2, which are selected as the location group leaders for the group. Upon being configured as the LGLs, STA1 and STA2 become the initiating stations that initiates the ranging processes, e.g., via FTM protocol. In the example of FIG. 5, STA1 is an initiating device that initiates an FTM positioning procedure with AP1 and AP2, while AP1 and AP2 are responding devices that respond to the FTM positioning procedure. Similarly, STA2 is an initiating device that initiates an FTM positioning procedure with AP3 and AP4, while AP3 and AP4 are responding devices that respond to the FTM positioning procedure. Because the APs may operate in different wireless channels, concurrent FTM ranging in different wireless channels can save time in determining the location information.

To initiate FTM ranging, in step 511, STA1 sends FTM requests to both AP1 and AP2. In step 512, STA1 receives ACKs from AP1 and AP2. Note that channel switching may be required if AP1 and AP2 operate in different channels. In step 513, AP1 transmits a first FTM measurement frame FTM_1 at time instance t1_1 (m=1), which denotes the first measurement session. STA1 receives FTM_1 at time instance t2 (m=1). In step 514, in response to the received FTM_1, STA1 transmits an ACK_1 frame to AP1 at time instance t3 (m=1). AP1 receives the ACK_1 frame at time instance t4_1 (m=1). In step 515, AP1 transmits a follow up FTM frame FTM_1 F to STA1. The FTM_1 F payload includes the timestamps t1_1 and t4_1 of the first measurement session. After possible channel switching, the second measurement session starts. In step 516, AP2 transmits a second FTM measurement frame FTM_2 at time instance t1_2 (m=2), which denotes the second measurement session. STA1 receives FTM_2 at time instance t2 (m=2). In step 517, in response to the received FTM_2, STA1 transmits an ACK_2 frame to AP2 at time instance t3 (m=2). AP2 receives the ACK_2 frame at time instance t4_2 (m=2). In step 618, AP2 transmits a follow up FTM frame FTM_2 F to STA1. The FTM_2_F payload includes the timestamps t1_2 and t4_2 of the second measurement session.

Similarly, to initiate FTM ranging, in step 531, STA2 sends FTM requests to both AP3 and AP4. In step 532, STA2 receives ACKs from AP3 and AP4. Note that channel switching may be required if AP3 and AP4 operate in different channels. In step 533, AP3 transmits a first FTM measurement frame FTM_3 at time instance t1_3 (m=3), which denotes the third measurement session. STA2 receives FTM_3 at time instance t2 (m=3). In step 534, in response to the received FTM_3, STA2 transmits an ACK_3 frame to AP3 at time instance t3 (m=3). AP3 receives the ACK_3 frame at time instance t4_3 (m=3). In step 535, AP3 transmits a follow up FTM frame FTM_3_F to STA2. The FTM_3_F payload includes the timestamps t1_3 and t4_3 of the third measurement session. After possible channel switching, the fourth measurement session starts. In step 536, AP4 transmits a fourth FTM measurement frame FTM_4 at time instance t1_4 (m=4), which denotes the fourth measurement session. STA2 receives FTM_4 at time instance t2 (m=4). In step 537, in response to the received FTM_4, STA2 transmits an ACK_4 frame to AP4 at time instance t3 (m=4). AP4 receives the ACK_4 frame at time instance t4_4 (m=4). In step 638, AP4 transmits a follow up FTM frame FTM_4_F to STA2. The FTM_4_F payload includes the timestamps t1_4 and t4_4 of the fourth measurement session.

Based on the FTM measurement results, STA1 and STA2 compute the time-of-flight (TOF) or Round Trip Delay (RTD/2) and its corresponding range/distance to AP1-AP2 and AP3-AP4 respectively (step 541). For example:

$$TOF\_AP1=[(t4\_1-t1\_1)-(t3-t2)]/2(m=1)$$

$$TOF\_AP2=[(t4\_2-t1\_2)-(t3-t2)]/2(m=2)$$

$$TOF\_AP3=[(t4\_3-t1\_3)-(t3-t2)]/2(m=3)$$

$$TOF\_AP4=[(t4\_4-t1\_4)-(t3-t2)]/2(m=4)$$

and $$\text{Distance from } STA1 \text{ to } AP1 = C*TOF\_AP1$$

$$\text{Distance from } STA1 \text{ to } AP2 = C*TOF\_AP2$$

$$\text{Distance from } STA2 \text{ to } AP3 = C*TOF\_AP3$$

$$\text{Distance from } STA2 \text{ to } AP4 = C*TOF\_AP4$$

where

C is the speed of radio signal.

In three-dimensional (3D) positioning, if STA1 and STA2 are physically close to each other and know the absolute location of AP1-AP2, then STA1 and STA2 together are able to determine their coarse location by combining the four distances to AP1-AP4 (step 542). By performing concurrent FTM ranging over different wireless channels, the overall latency in performing FTM frame exchange can be largely reduced.

Figure 6:
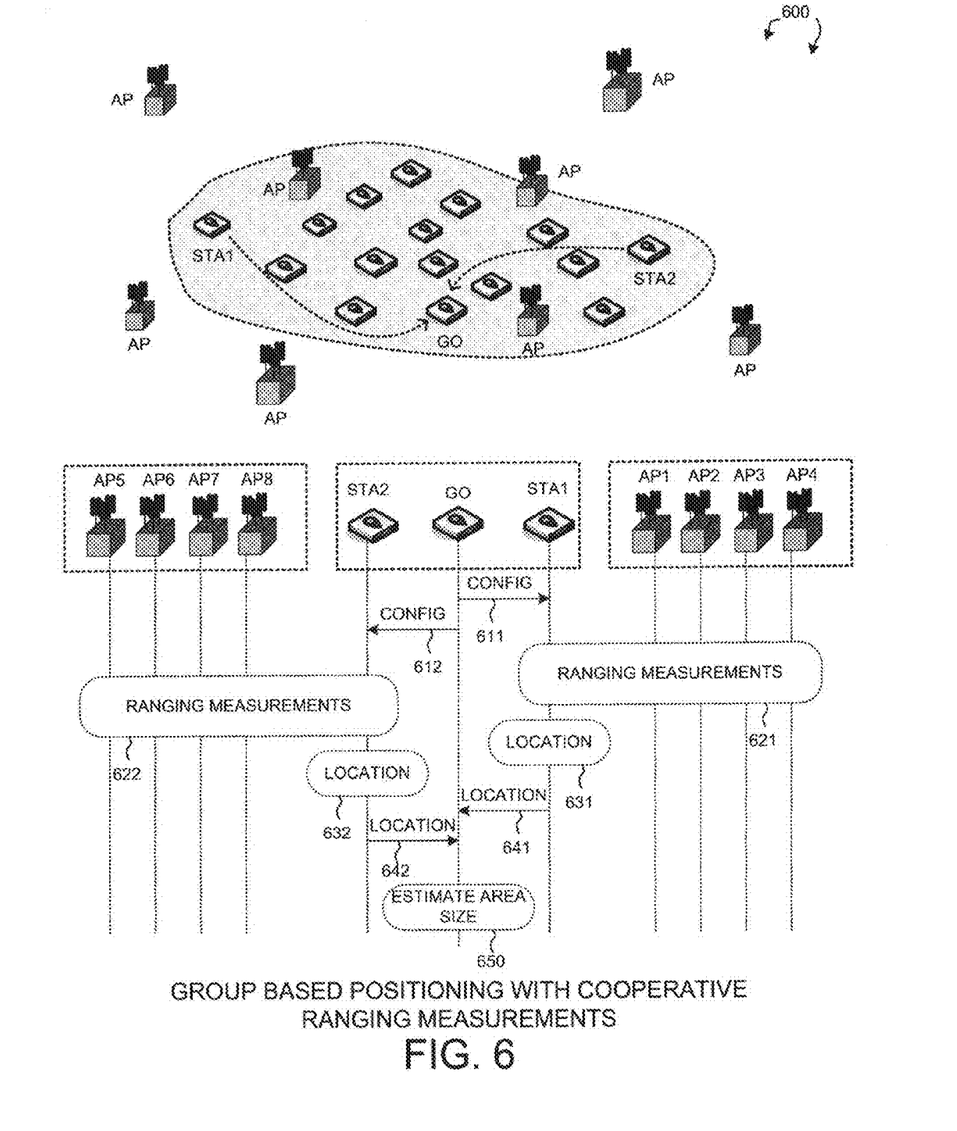
FIG. 6 illustrates one embodiment of group-based location through cooperative ranging measurements.

FIG. 6 illustrates one embodiment of group-based location through cooperative ranging measurements in a wireless local area network 600. Wireless local area network 600 is an indoor network and comprises a plurality of access points (APs) and a group of non-AP wireless stations (STAs). The plurality of access points are located in different physical locations in the indoor wireless network to facilitate indoor location service. The group of non-AP wireless stations belong to a communication group.

In the example of FIG. 6, the group owner (GO) selects two or more STAs, e.g., STA1 and STA2 to manage location determination activities. In step 611, the GO sends configuration information to STA1. In step 612, the GO sends configuration information to STA2. For a group of STAs surrounded by a plurality of wireless communications devices (APs), an STA could have better ranging measurement with some of "the plurality of wireless communications devices" than the others could. It is because each STA has different channel characteristic, like LOS, distance, localized interference and other factors to a subset of "the plurality of wireless communications devices". As a result, the group owner delegates one or more wireless stations (STAs) to do ranging with a subset of "the plurality of wireless communications devices". For example, STA1 may perform ranging with AP1-AP4 (step 621), while STA2 may perform ranging with AP5-AP8 (step 622). After ranging, STA1 and STA2 determines their location information (steps 631 and 632), and report to the group owner the location information (steps 641 and 642). Finally, in step 650, the GO can estimate the area covered by the group of STAs. For example, the GO identifies the STAs (e.g., STA1 and STA2) stay at the boarder of the group of boarder of the group of STAs (All STAs are located in the area enclosed by the boarder). With the location information from the STAs stay at the boarder of the group, the GO can estimate the size of the area and make sure all the STAs stay within the area.

In another example, the GO can initiated a sequence of ranging requests across multiple devices within the group to determine positions within a daisy chain of users (e.g., runners in a long-distance running competition). Via cooperative ranging, the GO can collect useful location information for the group and reduce the amount of ranging protocol overhead.

Figure 7:
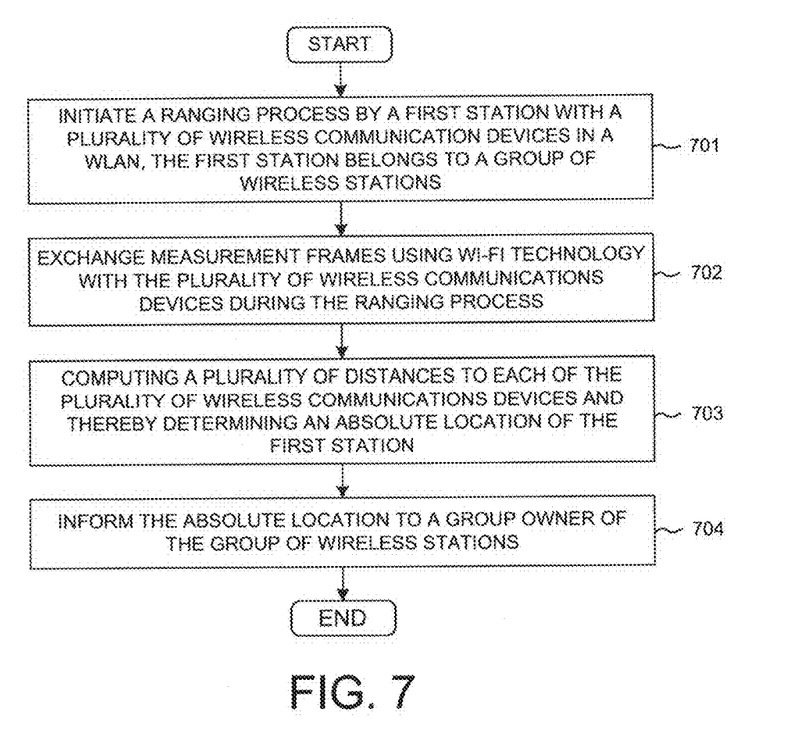
FIG. 7 is a flow chart of a method of group-based positioning in accordance with one novel aspect.

FIG. 7 is a flow chart of a method of group-based positioning in accordance with one novel aspect. In step 701, a first wireless station initiates a ranging process with a plurality of wireless communications devices in a wireless local area network. The first station belongs to a group of wireless stations. In step 702, the first station exchanges measurement frames with the plurality of wireless communications devices during the ranging process. In step 703, the first station computes a plurality of distances to each of the plurality of wireless communications devices and thereby determining an absolute location of the first station. In step 704, the first station informs the absolute location to a group owner of the group of wireless stations. In one embodiment, the group owner selects the first station from the group based at least on one of a device location, a device capability, a device loading, a link condition, a power status, and wireless channel availability of the first station. In another embodiment, a second station is selected from the group of wireless stations to initiate a second ranging process.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

initiating a ranging process by a first station with a plurality of wireless communications devices in a wireless local area network, wherein the first station belongs to a group of wireless stations;

exchanging measurement frames with the plurality of wireless communications devices during the ranging process;

computing a plurality of distances from the first station to each of the plurality of wireless communications devices and thereby determining an absolution location of the first station; and informing the absolute location to a group owner of the group of wireless stations, wherein the group owner is a wireless station included in the group of wireless stations, wherein the first station is selected from the group of wireless stations by the group owner, and wherein the first station is the only wireless station in the group that performs the ranging process.

2. The method of claim 1, wherein the selection is based at least on one of a device location, a device capability, a device loading, a link condition, a power status, and wireless channel availability of the first station.

3. The method of claim 1, wherein each of the plurality of wireless communications devices has information about its absolute location.

4. The method of claim 3, wherein each of the plurality of wireless communications devices is an access point (AP).

5. The method of claim 1, wherein a service is provided to the group of wireless stations based on the absolution location.

6. The method of claim 1, wherein the ranging process is based on fine timing positioning (FTM) protocol.

7. The method of claim 1, wherein a second station is selected from the group of wireless stations to initiate a second ranging process.

8. The method of claim 7, wherein the first station performs ranging with a subset of the plurality of wireless communications devices, and wherein a second station performs ranging with another subset of the plurality of wireless communications devices.

9. The method of claim 7, wherein the first station performs ranging measurements cooperatively with the second station to determine the absolute location.

10. A wireless station, comprising;
a processor coupled to a memory;
a ranging module that initiates a ranging process with a plurality of wireless communications devices in a wireless local area network, wherein the wireless station belongs to a group of wireless stations;
a transceiver that exchanges measurement frames with the plurality of wireless communications devices during the ranging process;
a positioning module that computes a plurality of distances from the wireless station to each of the plurality of wireless communications devices and thereby determining an absolution location of the wireless station; and
a configuration module that informs the absolute location to a group owner of the group of wireless stations, wherein the group owner is selected from the group of wireless stations, wherein the wireless station is selected from the group of wireless stations by the group owner, and wherein the wireless station is the only wireless station in the group that performs the ranging process.

11. The wireless station of claim 10, wherein the selection is based at least on one of a device location, a device capability, a device loading, a link condition, a power status, and wireless channel availability of the wireless station.

12. The wireless station of claim 10, wherein each of the plurality of wireless communications devices has information about its absolute location.

13. The wireless station of claim 12, wherein each of the plurality of wireless communications devices is an access point (AP).

14. The wireless station of claim 10, wherein a service is provided to the group of wireless stations based on the absolution location.

15. The wireless station of claim 10, wherein the ranging process is based on fine timing positioning (FTM) protocol.

16. The wireless station of claim 10, wherein a second station is selected from the group of wireless stations to initiating a second ranging process.

17. The wireless station of claim 16, wherein the wireless station performs ranging with a subset of the plurality of wireless communications devices, and wherein a second station performs ranging with another subset of the plurality of wireless communications devices.

18. The wireless station of claim 16, wherein the wireless station performs ranging measurements cooperatively with the second station to determine the absolute location.

* * * * *